US011897147B2

(12) United States Patent
Osgouei et al.

(10) Patent No.: US 11,897,147 B2
(45) Date of Patent: Feb. 13, 2024

(54) AUTOMATED STORAGE OPTIMIZATION AND STACKABLE PALLETS

(71) Applicants: Reza Ettehadi Osgouei, Houston, TX (US); Eliah Everhard, The Woodlands, TX (US); Charles Thompson, Kingwood, TX (US); Mehrdad Gharib Shirangi, Houston, TX (US); Jason Norman, Houston, TX (US)

(72) Inventors: Reza Ettehadi Osgouei, Houston, TX (US); Eliah Everhard, The Woodlands, TX (US); Charles Thompson, Kingwood, TX (US); Mehrdad Gharib Shirangi, Houston, TX (US); Jason Norman, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 359 days.

(21) Appl. No.: 16/951,232

(22) Filed: Nov. 18, 2020

(65) Prior Publication Data

US 2022/0152832 A1  May 19, 2022

(51) Int. Cl.
*G06F 7/00* (2006.01)
*B25J 9/16* (2006.01)
(Continued)

(52) U.S. Cl.
CPC ........... *B25J 9/1687* (2013.01); *B25J 9/0084* (2013.01); *B65D 19/385* (2013.01); *B65G 1/10* (2013.01);
(Continued)

(58) Field of Classification Search
CPC ........ B25J 9/1687; B25J 9/0084; B25J 9/026; B25J 15/0019; B25J 15/06; B25J 15/0616;
(Continued)

(56) References Cited

U.S. PATENT DOCUMENTS 2,700,520 A * 1/1955 Skubic ................. B65D 19/385
403/219
3,107,024 A * 10/1963 Johnson ................... B65D 7/24
108/53.5
(Continued)

FOREIGN PATENT DOCUMENTS

JP          6452893 B     1/2019
JP          6452893 B1 *  1/2019  ................ B25J 9/02
(Continued)

OTHER PUBLICATIONS

International Search Report and Written Opinion Issued in International Application No. PCT/US2021/059079 dated Feb. 25, 2022; 11 Pages.

*Primary Examiner* — Yolanda R Cumbess
(74) *Attorney, Agent, or Firm* — CANTOR COLBURN LLP

(57) ABSTRACT

Examples described herein provide a system that includes a pallet. The pallet includes a base and a support member extending from the base. The support member is configured to support another pallet upwardly adjacent to and spaced from goods on the pallet. The support member is configured with an indexing feature. The system further includes a robot including a pallet engaging member configured to engage the pallet at the indexing feature on the support member. The system further includes a control system to control the robot based on a task.

20 Claims, 15 Drawing Sheets

(51) Int. Cl.
  *B65G 61/00* (2006.01)
  *B25J 9/00* (2006.01)
  *B65G 1/10* (2006.01)
  *B65D 19/38* (2006.01)
  *B25J 15/06* (2006.01)
  *B25J 15/00* (2006.01)
  *B25J 9/02* (2006.01)
  *E21B 43/16* (2006.01)

(52) U.S. Cl.
  CPC ............... *B65G 61/00* (2013.01); *B25J 9/026* (2013.01); *B25J 15/0019* (2013.01); *B25J 15/06* (2013.01); *B65D 2519/0097* (2013.01); *E21B 43/16* (2013.01)

(58) Field of Classification Search
  CPC ..................... B65D 19/385; B65D 2519/0097; B65G 1/10; B65G 61/00; E21B 43/16
  USPC .................................. 700/213–214, 217, 218
  See application file for complete search history.

(56) References Cited

U.S. PATENT DOCUMENTS

| | | | |
|---|---|---|---|
| 10,793,047 | B1 | 10/2020 | Theobald |
| 2007/0248446 | A1* | 10/2007 | Wildner ................. B65G 61/00 414/788 |
| 2018/0057204 | A1* | 3/2018 | Johnson ............... B65D 19/385 |
| 2019/0062073 | A1* | 2/2019 | Ferre .......................... B66F 9/18 |
| 2019/0352101 | A1* | 11/2019 | Levine ................... B65D 19/42 |

FOREIGN PATENT DOCUMENTS

| | | | | |
|---|---|---|---|---|
| JP | 2020099980 | A | * | 7/2020 |
| JP | 2020099980 | A | | 7/2020 |
| JP | 2020163479 | A | | 10/2020 |
| KR | 2012046487 | A | * | 5/2012 |
| KR | 20120046487 | A | | 5/2012 |

\* cited by examiner

900

```
┌─────────────────────────────────────────┐
│ Receive A Task From A Fluid Management  │
│ System, The Task Being Based On At      │
│ Least One Of A Fluid Plan Or Real-Time  │
│ Data Associated With A Hydrocarbon      │
│ Exploration And Recovery Operation      │
│                  902                    │
└─────────────────────────────────────────┘
                    │
                    ▼
┌─────────────────────────────────────────┐
│ Distribute The Task To At Least One Of  │
│ A Plurality Of Robots Based At Least In │
│ Part On A Type Of The Task              │
│                  904                    │
└─────────────────────────────────────────┘
                    │
                    ▼
┌─────────────────────────────────────────┐
│ Cause The At Least One Of The Plurality │
│ Of Robots To Execute The Task           │
│                  906                    │
└─────────────────────────────────────────┘
```

FIG.9

AUTOMATED STORAGE OPTIMIZATION AND STACKABLE PALLETS

BACKGROUND

Embodiments described herein relate generally to hydrocarbon exploration and recovery and more particularly to techniques for automated storage optimization and stackable pallets.

Inventory management at hydrocarbon exploration and recovery operations consumes significant space and manpower. For example, hydrocarbon exploration and recovery operations utilize structures housing equipment, which is used to manage fluids properties, warehouse mud tanks, mud pumps, surface connections, and the wellbore. Such structures can occupy approximately 85% of space at the hydrocarbon exploration and recovery operations.

SUMMARY

Embodiments of the present invention are directed to automated storage optimization and stackable pallets.

A non-limiting example system includes a pallet. The pallet includes a base and a support member extending from the base. The support member is configured to support another pallet upwardly adjacent to and spaced from goods on the pallet. The support member is configured with an indexing feature. The system further includes a robot including a pallet engaging member configured to engage the pallet at the indexing feature on the support member. The system further includes a control system to control the robot based on a task.

A non-limiting example pallet includes a base and a support member extending from the base. The support member is configured to support another pallet upwardly adjacent to and spaced from goods on the pallet. The support member is configured with an indexing feature.

A non-limiting example method includes receiving a task from an autonomous fluid management system, the task being based on at least one of a fluid plan or real-time data associated with hydrocarbon exploration and recovery operation. The method further includes distributing the task to at least one of a plurality of robots based at least in part on a type of the task. The method further includes causing the at least one of the plurality of robots to execute the task.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures:

FIG. 9 depicts a flow diagram of a method for automated storage optimization according to one or more embodiments described herein;

DETAILED DESCRIPTION

In the field of drilling and completion fluids for hydrocarbon exploration and recovery operations, products are typically stored on pallets of stacks of sacked goods, in drums, or in some other type of container. These containers are stored together in a materials storage room, commonly referred to as a sack room, sack house, storeroom, etc., and accessed by personnel with equipment to manipulate and move containers such as pallets and drums around in this space.

Figure 1:
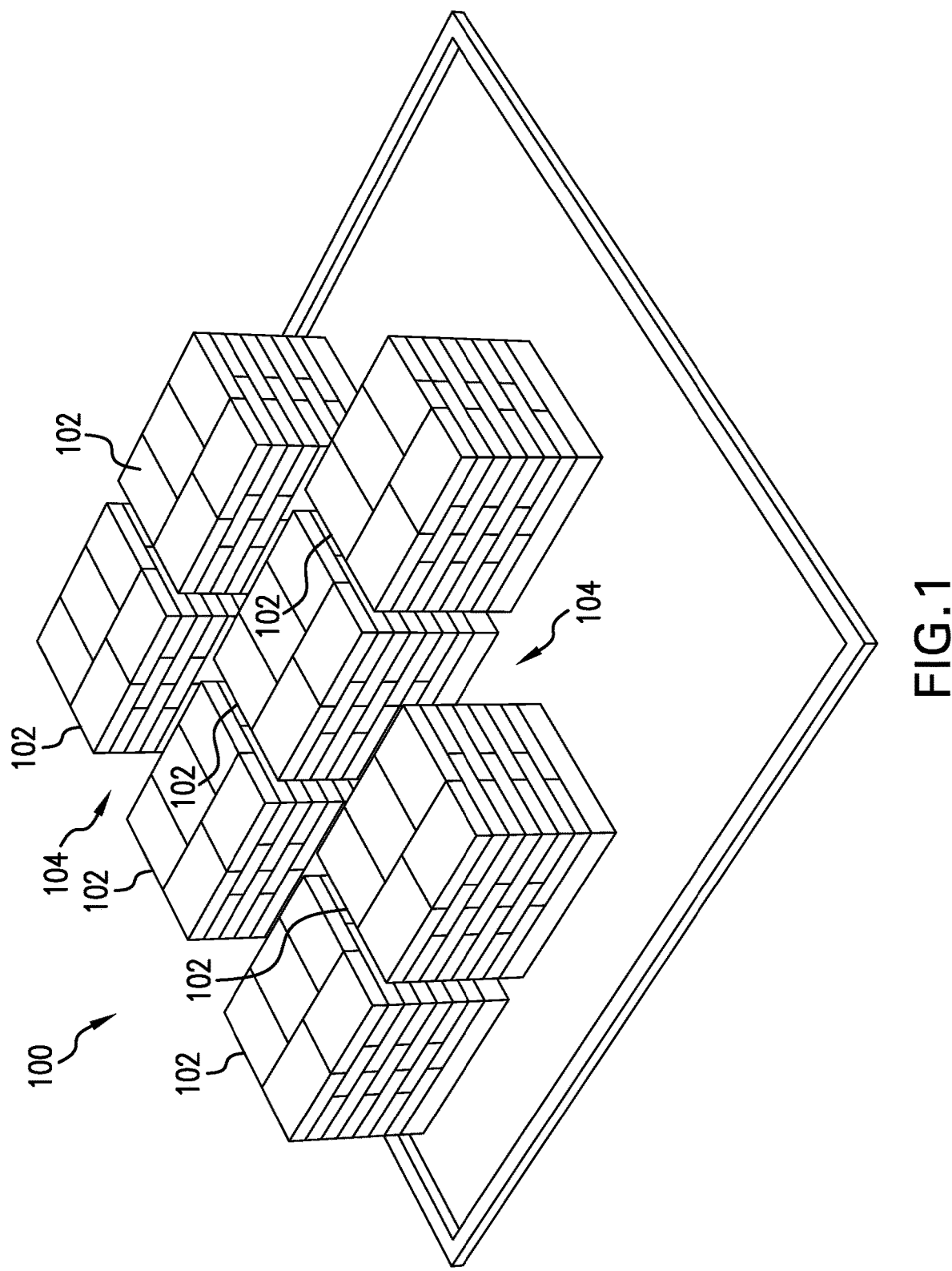
FIG. 1 depicts a conventional storeroom for storing a plurality of conventional pallets.

In some environments, pallets are typically arranged in a single layer on the ground. In other environments, pallets may be stacked vertically, but such a stacking arrangement may be unstable. For example, the weight of an upper pallet rests on the goods of a pallet beneath it. A vertical stack of pallets can be unstable because the goods may not be level or stable themselves. Moreover, paths between pallet rows are used for personnel to be able to physically move or access any particular product. This arrangement makes for inefficient use of the total volume of space available and can limit the availability of products relegated to additional spaces (e.g., on the deck of a rig) with an increased risk of exposure and liability. For example, only 50%-65% of the given surface area of the sack room can be used to store products, the remainder of which may require additional storage space elsewhere. Even more, the time to access any particular product is directly a function of how the sack room is arranged. As shown in FIG. 1, conventional storeroom 100 (such as a sack room) enables the storage of conventional pallets 102. However, significant space 104 exists between the conventional pallets 102, which is an inefficient use of the conventional storeroom 100.

Also by virtue of the very nature of drilling, deviations from a drilling plan can occur. These deviations may necessitate access to a variety of products suitable for the particular instance. Conventionally, rig personnel will arrange products in a certain way to anticipate this, but their pending duties limit the amount of time that can be spent planning and arranging accordingly, and their effort can only be reasonably limited to the arrangement of full pallets of a product on the storeroom floor. Further, such anticipation relies on the experience and knowledge of the particular personnel currently working. It is difficult, risky, and inefficient use of personnel to consider the arrangement of products and such arrangements can be inaccurate.

Further, with the prior art, when certain products are called for by rig operations personnel, the containers such as sacks or drums of products are physically moved by hand and delivered to either a manual or automated system for adding the product to the drilling fluids.

Conventional solutions present traditional methods of material handling that require the bulk packaging of products into specialized containers, the effects of which reach far back into the chain of supply, requiring significant design changes and additional planning, as well as a full commitment by product service providers to a fully bulk-handling solution, or a split commitment to traditional sacks and drums, and bulk handling technologies.

With the advancements in materials handling and automated industrial spaces, much of the inherent risk, loss of time, and additional planning that makes up the current model can be eliminated. Further to this is the notion of fully remote operations which can reduce headcount on the rig.

The present techniques address these and other shortcomings of the prior art by providing techniques for automated storage optimization and stackable pallets. According to one or more embodiments described herein, a coordinated network of robots and automated systems is provided that have associated therewith a controlling algorithm and communication protocol with a separate distributive controller. Further, according to one or more embodiments described herein, a stackable pallet is provided that can be employed in the material storage areas of a drilling rig. Using one or more of the network of robots, the automated systems, and/or the stackable pallets, the arrangement of products in a sack room or other storage location can be optimized according to drilling plans and deviations. This optimization enables minimizing the amount of time to access any particular product, eliminating much of the risk and time needed for personnel to perform the equivalent tasks, improving accuracy, increasing production time while reducing non-production time, and the like.

In particular, the present techniques provide for a system of networked robots. In examples, the robots can include one or more of the following types of robots: a robotic overhead crane (referred to as a "gantrybot"), one or several industrial robots for loading/unloading pallets of sack products (referred to as a "sackbot"), and/or one or several industrial robots for the dispensing of fluids from a drum or other container (referred to as a "drumbot"). A control system is provided that can direct tasks among the networked robots. The control system can also send and receive information with a separate distributive network control system that manages other clustered nodes in reading current and anticipated conditions of one or more processes occurring at a hydrocarbon exploration and recovery operation.

Figure 2:
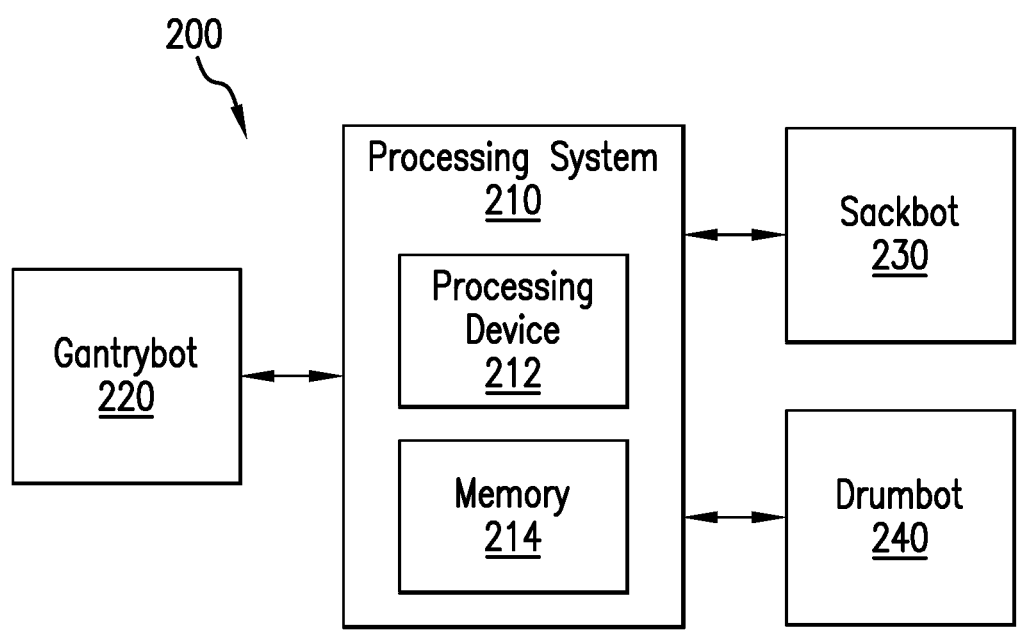
FIG. 2 depicts block diagram of a system for automated storage optimization according to one or more embodiments described herein.

FIG. 2 depicts a block diagram of a system 200 for automated storage optimization according to one or more embodiments described herein. The system 200 enables pallets and articles (individual items stored on the pallets) to be proactively (based on fluid plan) and reactively (based on real-time data) arranged such that desired articles are available as needed and on-demand.

In the example of FIG. 2, the system 200 includes a processing system 210, a gantrybot 220, a sackbot 230, and a drumbot 240 (collectively, "the robots 220, 230, 240").

The processing system 210 is communicatively coupled to devices/systems for performing tasks and/or to controllers for controlling the devices/systems to perform tasks. In this way, the processing system 210 acts as a control system that can direct tasks among the robots 220, 230, 240. For example, the processing system 210 can direct the gantrybot 220 to move a pallet from one location to another location, can direct the sackbot 230 to load a sack of product for use at a hydrocarbon exploration and recovery operation, can direct the drumbot 240 to pump a liquid product from a drum for use at the hydrocarbon exploration and recovery operation, and other similar operations. According to one or more embodiments described herein, the processing system 210 can utilize multiple planes of arrangement to arrange pallets with minimal clearances (horizontally and vertically) to maximize storage space in the storeroom 301. To do this, the processing system 210 can utilize individual article and pallet position tracking using a system of coordinates common to each of the devices, pallets, sacks, robots, etc. in the storeroom 301. This enables the processing system 210 to know the location of any sack, drum, robot, etc. within the storeroom 301 at any given time. The processing system 210 can utilize sensors located throughout the storeroom 301 and/or associated with the robots 220, 230, 240 to track the products and sacks in the storeroom 301. In examples, each robot 220, 230, 240 can access, track, and update the unique coordinates of each independent article.

Further, multiple planes of arrangement increase the amount of product stored in the storeroom 301. The process system 210 can also employ near-constant arranging and rearranging of pallets and articles to optimize the amount of time to access a certain article based on a drilling or fluid plan and/or current/anticipated mud conditions.

The processing system 210 can also receive tasks to be performed by the robots 220, 230, 240 from another device or system, such as a fluid management system. Fluid management systems collect (or receive) and process a significant amount of data about various aspects of hydrocarbon exploration and recovery operations. An example of a fluid management system is an autonomous fluid management system. In some examples, the features and functionality of a fluid management system can be included in the processing system 210.

Figure 3:
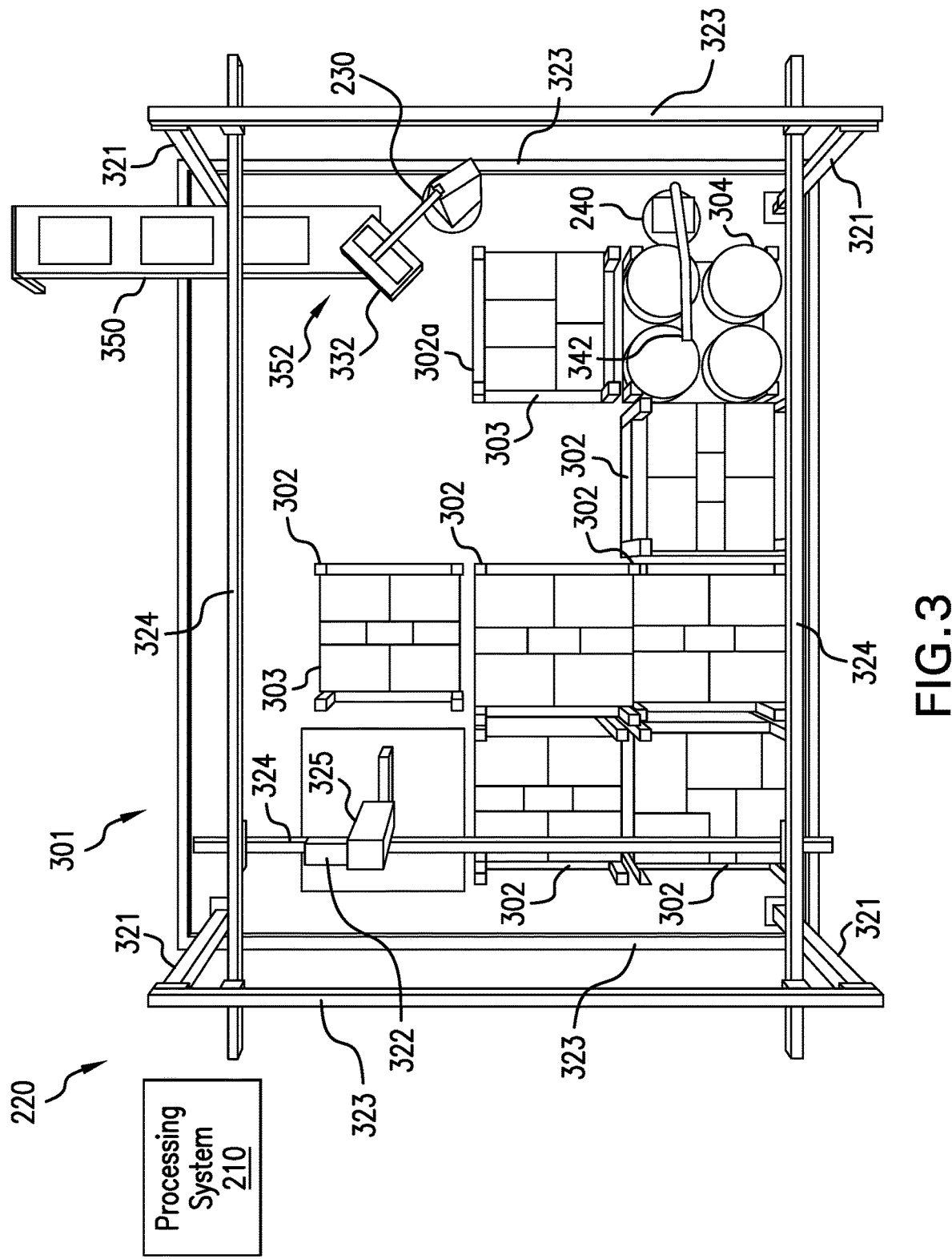
FIG. 3 depicts a top view of an example of the system of FIG. 2 for automated storage optimization according to one or more embodiments described herein.

The processing system 210 can also track the location of individual pallets and items/products and drums stored on the pallets in a storeroom (e.g., the storeroom 301 of FIG. 3). This enables individual items/products and drums and/or entire pallets to be made available in advance based on an anticipated need or on-demand based on a real-time (or near-real-time) request. For example, the processing system 210 can arrange pallets and articles (individual items stored on the pallets) proactively (based on fluid plan) and reactively (based on real-time data) such that the desired articles are available as needed and/or on-demand.

The various features and functions of the processing system 210 can be implemented as components, modules, engines, as instructions stored on a computer-readable storage medium, as hardware modules, as special-purpose hardware (e.g., application-specific hardware, application-specific integrated circuits (ASICs), application-specific special processors (ASSPs), field-programmable gate arrays (FPGAs), as embedded controllers, hardwired circuitry, etc.), or as some combination or combinations of these. According to aspects of the present disclosure, the features and functions described herein can be implemented using a combination of hardware and programming. The programming can be processor-executable instructions stored on a tangible memory, and the hardware can include the processing device 212 for executing those instructions. Thus a system memory (e.g., memory 214) can store program instructions that when executed by the processing device 212 implement the engines described herein. Other engines can also be utilized to include other features and functionality described in other examples herein.

Figure 4:
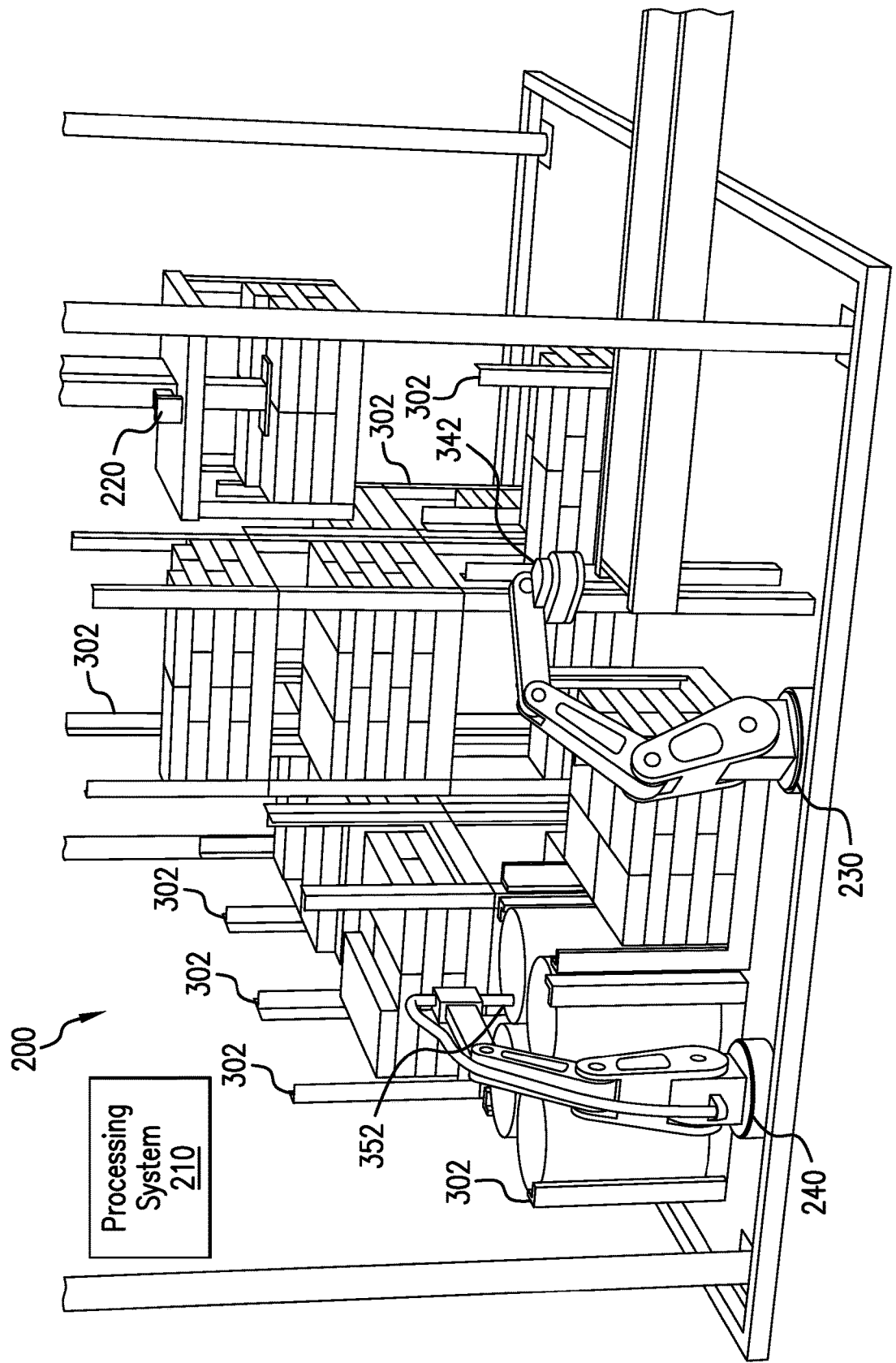
FIGS. 4, 5, and 6 depict different perspective views of the system of FIG. 2 for automated storage optimization according to one or more embodiments described herein.
Figure 5:
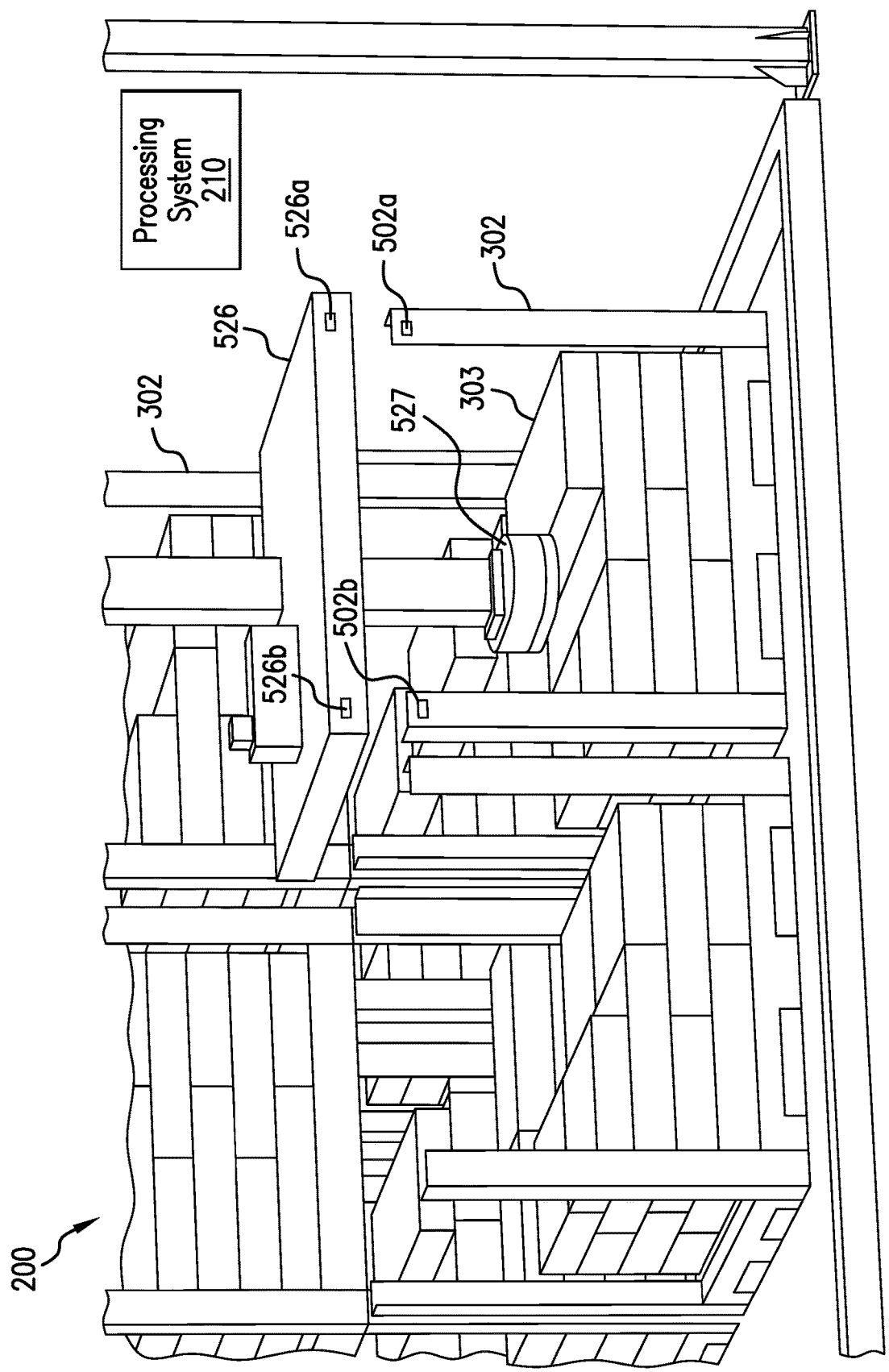
Figure 6:
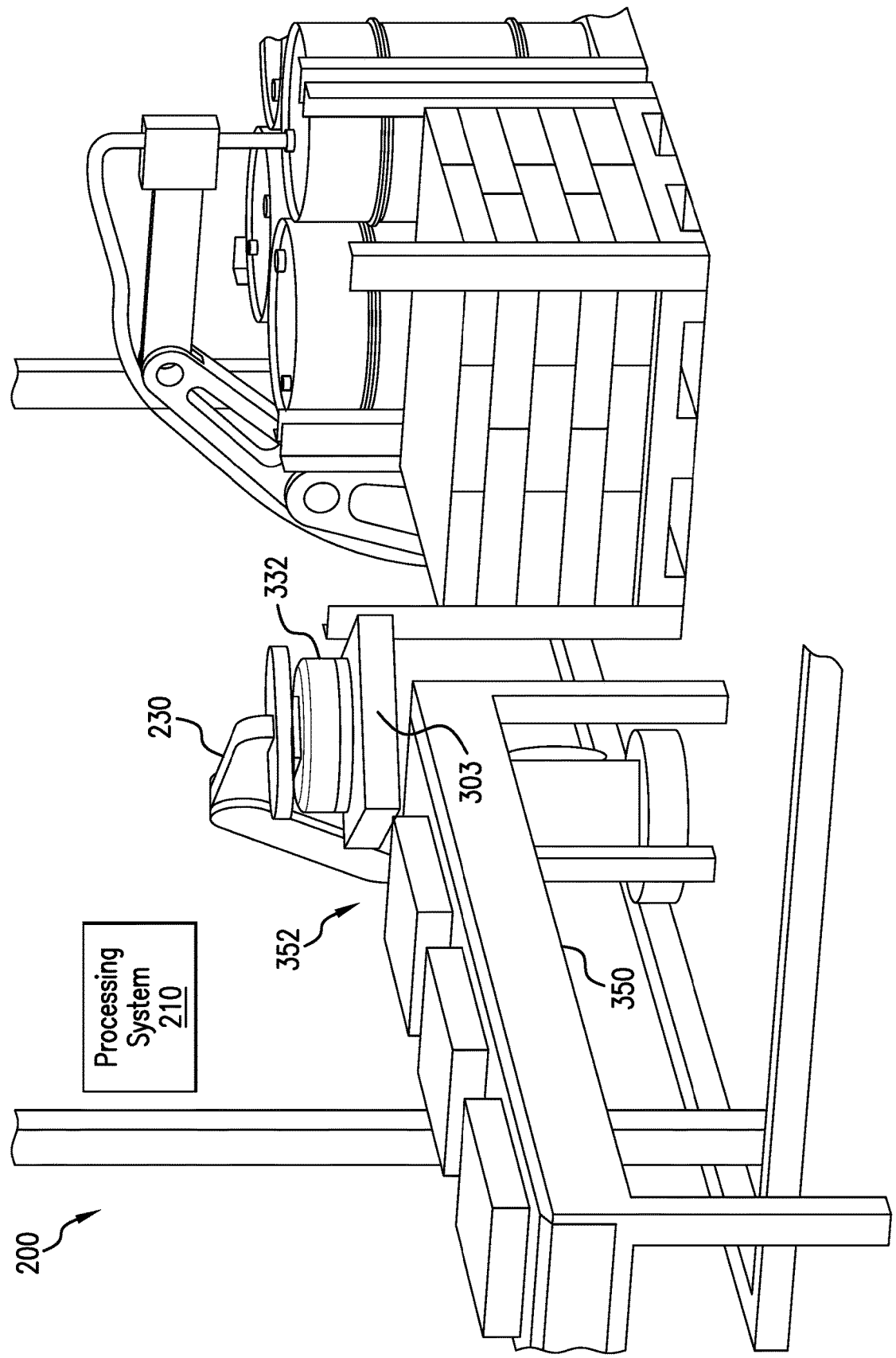
Figure 7:
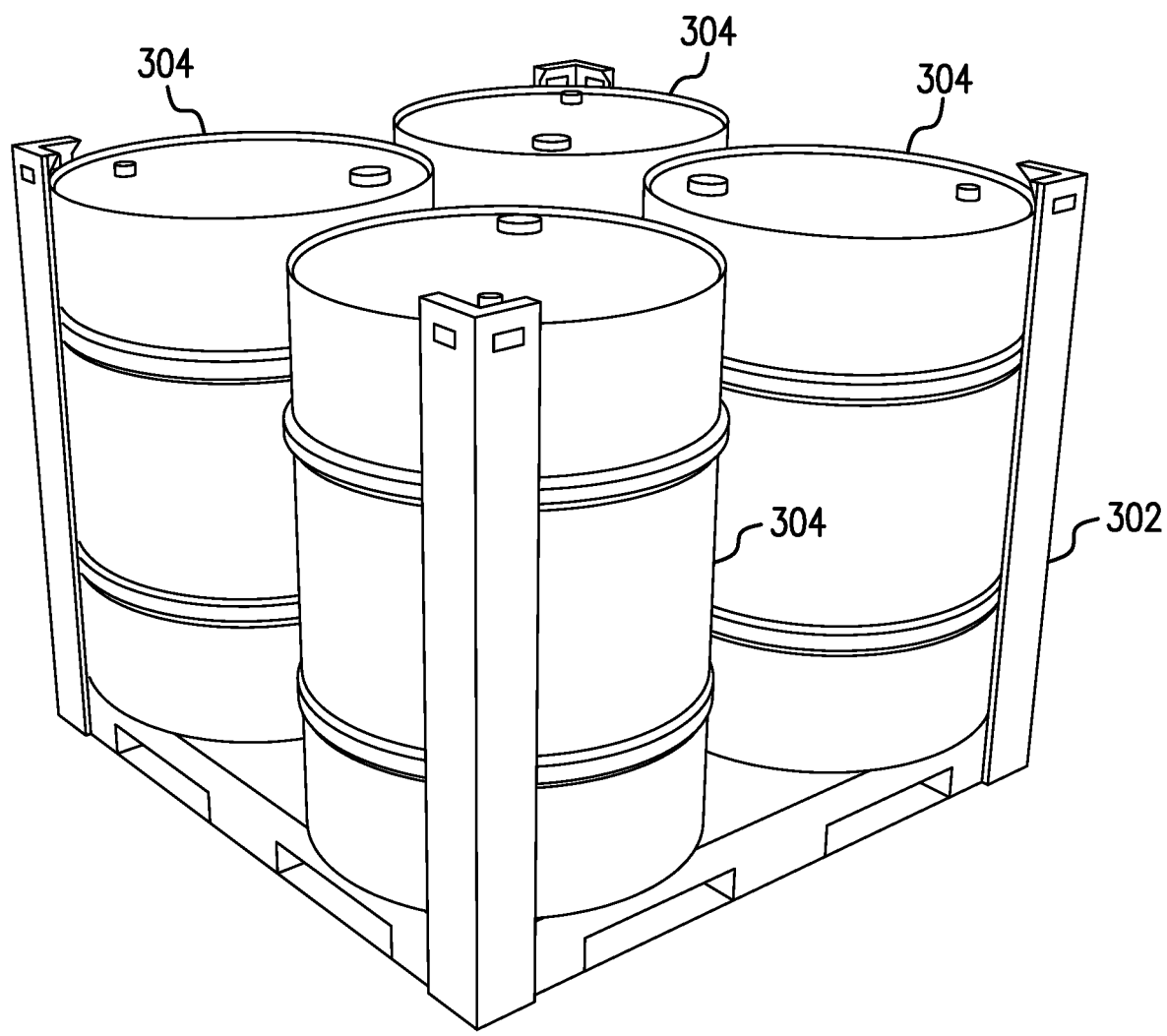
FIG. 7 depicts a perspective view of a pallet having drums stored thereon according to one or more embodiments described herein.
Figure 8:
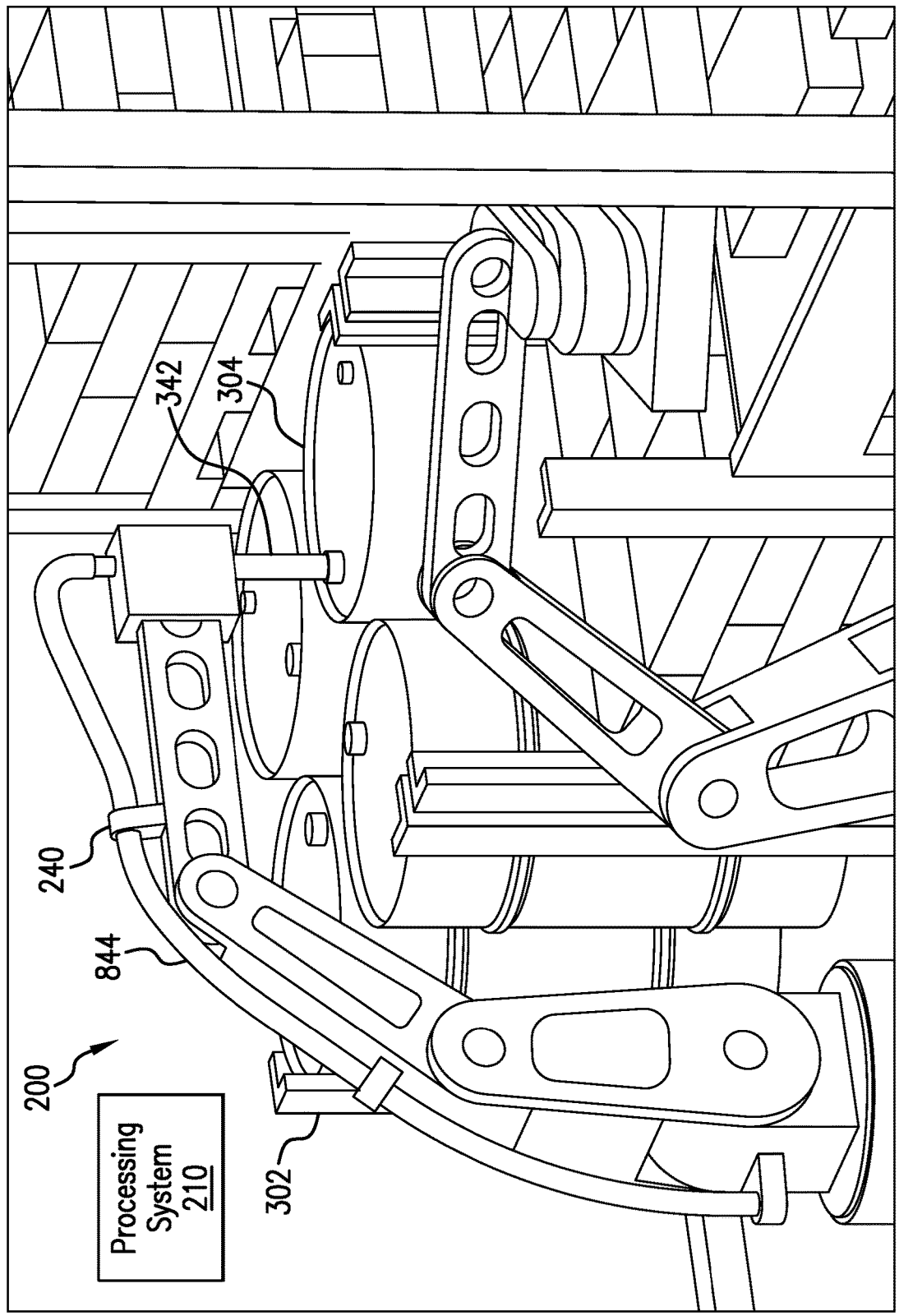
FIG. 8 depicts a perspective view of the system of FIG. 2 for automated storage optimization according to one or more embodiments described herein.

The features and functionality of the processing system 210 are now described with reference to FIGS. 2-7. In particular, FIG. 3 depicts a top view of an example of the system 200 of FIG. 2 for automated storage optimization according to one or more embodiments described herein. FIGS. 4, 5, and 6 depict different perspective views of the system 200 of FIG. 2 for automated storage optimization according to one or more embodiments described herein. FIG. 7 depicts a perspective view of a pallet 302 having drums 304 stored thereon according to one or more embodiments described herein. FIG. 8 depicts a perspective view of the system 200 of FIG. 2 for automated storage optimization according to one or more embodiments described herein.

The gantrybot 220 is an automated system having supported rails 321 along which a robotic vertical arm 322 can translate in the two directions parallel to the surface of the earth, constrained to the space between supporting posts 323, and over top of the pallets 302 in the storeroom 301. Affixed at this overhead point of translation is an arm or structure (i.e., the robotic vertical arm 322) that can translate perpendicular to the surface of the earth allowing for access to much of the volume of space contained between the supporting posts 323 and below the traveling horizontal members 324. At the lower extremity of the robotic vertical arm 322 is a unique end of arm tool set 325 having a pallet engaging member 526 (see FIG. 5) and/or an object engaging member (e.g., a vacuum gripper 527 shown in FIG. 5). The pallet engaging member 526 can include a plurality of indexing members 526a, 526b, etc., to engage indexing features 502a, 502b, etc. on the pallet 302. The unique end of arm tool set 225 enables the manipulation of entire pallets of products in fit for purpose stackable pallets (e.g., the pallets 302, the pallet 1102 of FIGS. 11A-11F) using the pallet engaging member 526, or of individual sack products using the object engaging member (e.g., the vacuum gripper 527 of FIG. 5) situated below the unique end of arm tool set 325.

The dual design of a unique end of arm tool set 325 enables the vacuum gripper 527 to descend into any of the particular positions within one of the pallets 302, or to raise to a position sufficiently high to allow for the translation of an entire pallet (e.g., one of the pallets 302) without disturbing the contents of that pallet (i.e., objects stored on the pallet). In other words, the vertical distance between the pallet engaging member 526 and the vacuum gripper 527 can be independently set and adjusted, such as according to a particular task.

Using the gantrybot 220, the processing system 210 can arrange and rearrange the pallets 302 of sacks 303 (the individual items/objects/products stored on the pallets 302) or drums 304 (individual liquid-holding containers stored on the pallets 302) in accordance with a master plan that is anticipating any number of combinations of products to be on hand. The processing system 210 can track the position of the sacks 303 or the drums 304 in three-dimensional space (as pallets may stack to whatever height the space physical allows for) and continually arrange and rearrange them. For example, the pallets 302, sacks 303, and/or drums 304 can be arranged and rearranged according to predictions of the processing system 210, which minimizes the amount of time to access or retrieve a particular product and enables contingency efforts to be preassembled as necessary. By allowing the gantrybot 220 to operate continuously, the time-to-product is substantially reduced as the gantrybot 220 works in conjunction with the processing system 210 and preferences, which may be input by an operator to guide decisions made by the processing system 210 and/or which may be learned over time by the processing system 210. This enables pallets 302 to be a mixed arrangement of products (i.e., a pallet can have different types of sacks 303 and/or drums 304 stored thereon) that are particularly well-suited for a contingent situation or a blend of products that enables modulation of process variables as any of the products are independently added.

When an active call, from the processing system 210, for a particular product or series of products (i.e., sacks 303 and/or drums 304) is executed, the gantrybot 220 relocates an entire pallet of sack products to the sackbot 230 and/or drumbot 240 situated at feed end 352 of a conveyor system 350. In examples the sackbot 230 is equipped with a vacuum gripper end of arm tool 332 or another suitable device for picking up sacks 303 from a pallet 302 placed at the feed end 352 of the conveyor system 350. In examples, the drumbot 240 is equipped with a suction hose-end of arm tooling 342, leading directly to the product pit. In some examples, the gantrybot 220 operates in a space protected by light curtains (not shown) that can stop all operations if the light curtains are intersected, such as by a human.

The sackbot 230 is an industrial robot that is situated in a location of the storeroom 301 that enables it to access a pallet 302a delivered to it by the gantrybot 220 and to feed the feed end 352 of the conveyor system 350 that can deliver products, such as to a product pit. In some examples, the products are delivered to an automated sack splitting unit (not shown).

The sackbot 230 is outfitted with a similar vacuum gripper end of arm tool 332 to the gantrybot 220 and has access to the entire volume of the contents of the pallet 302. In examples, the sackbot 230 includes load sensing capabilities, which enable the sackbot 230 to confirm a product lift. With this access and end of arm tooling, the sackbot 230 can access any of the uppermost sacks of products on the pallet (shown as pallet 302a in FIG. 3) delivered at any given time, and because of the interconnectedness of the processing system 210, the spatial positions of each of the individual sacks 303a on the pallet 302a are known and constantly updated. This allows for a sackbot 230 to rearrange the sacks 303a in the pallet 302a, with changes tracked by the processing system 210 so that when a partially emptied pallet is collected and returned to the storeroom 301 by the gantrybot 220, the spatial coordinates of each sack 303a are also retained and updated.

Depending on the most current call for product from the processing system 210, the sackbot 230 can select any of the several available products (e.g., the sacks 303) in a particular pallet (e.g., the pallet 302a), as each case may dictate, or simply unload the contents of a homogeneous pallet. The sackbot 230 can operate fully autonomously over loading and/or unloading items onto or from the conveyor system 350. In other words, the sackbot 230 can control the direction and relative position of the conveyor system 350, enabling the possible offloading of items already in a queue on the conveyer system 350 upon the occurrence of a deviation from the plan that may call for a different product.

In this case the sackbot 230 unloads one or more products from the conveyor system 350 back into a pallet while tracking and communicating each position with the processing system 210.

During idle time, a sackbot 230 can be employed by the gantrybot 220 to rearrange sacks 303 within a pallet 302 while the gantrybot 220 arranges pallets 302 in the three-dimensional space of the storeroom 301. For example, pallets 302 and/or sacks 303 can be arranged based on expected future needs so that anticipated pallets 302 and/or sacks 303 are readably available and easily accessible. This improves the efficiency of hydrocarbon exploration and recovery operations.

The drumbot 240 is similar to the sackbot 230 in that it provides, on demand from the processing system 210, access to products. However, in the case of the drumbot 240, the products are liquid stored in barrels/drums. For example, FIG. 7 depicts drums 304 stored on the pallet 302. As shown in FIG. 8, the drumbot 240 is equipped with a suction hose-end of arm tooling 342 that can be inserted into an opening or bunghole of the drum 304. The drumbot 240 can suction liquid from the drum 304 into another vessel, a product pit, etc., via a hose 844. In some examples, wetted parts of the drumbot 240 can be purged and/or cleaned between different fluids. For example, wetted parts of the drumbot 240, including the hose 844 and the suction hose-end of arm tooling 342, are cleaned between dissimilar or incompatible fluids being passed through the wetted parts.

It should be appreciated that, in some examples, multiple gantrybots 220, multiple sackbots 230, and/or multiple drumbots 240 can be implemented in storeroom 301. For example, one sackbot can be dedicated to loading sacks onto or unloading sacks off of the conveyor system 350 while another sackbot can be dedicated to rearranging sacks within the storeroom 301. In some examples, a dedicated sackbot can be positioned near a receiving zone (not shown) of the storeroom 301. This sackbot can be dedicated to moving sacks received at the storeroom 301 onto pallets 302 within the storeroom 301.

In some examples, the sackbot 230 and/or the drumbot 240 operates in a space protected by light curtains (not shown) that can stop operation if the light curtains are intersected, such as by a human.

FIG. 9 depicts a flow diagram of a method 900 for automated storage optimization according to one or more embodiments described herein. The method 900 can be implemented by any suitable system or device. For example, the method 900 can be implemented using the system 200 of FIGS. 2-6 and 8 and/or the processing system 1000 of FIG. 10.

At block 902, the processing system 210 receives a task from a fluid management system. The task can be based on a fluid plan and/or real-time data associated with a hydrocarbon exploration and recovery operation. In a proactive example, the task can be to add a sack 303 of product stored on a pallet 302 to a conveyor system 350 based on a fluid plan. That is, the processing system 210 can implement a fluid plan by calling for products to be made available to the hydrocarbon exploration and recovery operation so that products are available as needed. In a reactive example, the task can be to add a sack 303 of product stored on the pallet 302 to the conveyor system 350 based on real-time (or near-real-time) data.

At block 904, the processing system 210 distributes the task to at least one of the robots, including the gantrybot 220, the sackbot 230, and the drumbot 240. The task is distributed based on the type of task. For example, a task to rearrange pallets is distributed to the gantrybot 220, a task to load a sack 303 to the conveyor system 350 is distributed to the sackbot 230, and a task to unload liquid from a drum 304 is distributed to the drumbot 240.

At block 906, the processing system 210 causes a suitable robot to perform the task. This can include issuing a command to the robot to cause robot to begin the task. In some examples, the robot can respond with an acknowledgment that the command has been received. In some examples, the robot can respond with an acknowledgment that the task has been performed. The acknowledgment that the task has been performed can include information about the success or failure of the task, coordinates of an item that was moved, etc.

Additional processes also may be included. In some examples, robot is a gantrybot, and the task is one of to relocate a pallet or to relocate an item stored on the pallet. In some examples, the robot is a sackbot, and the task is to relocate an item stored on a pallet. In some examples, the robot is a drumbot, and the task is to pump a liquid product stored in a drum. It should be understood that the processes depicted in FIG. 9 represents one example illustration, and that other processes may be added or existing processes may be removed, modified, or rearranged without departing from the scope of the present disclosure.

Figure 10:
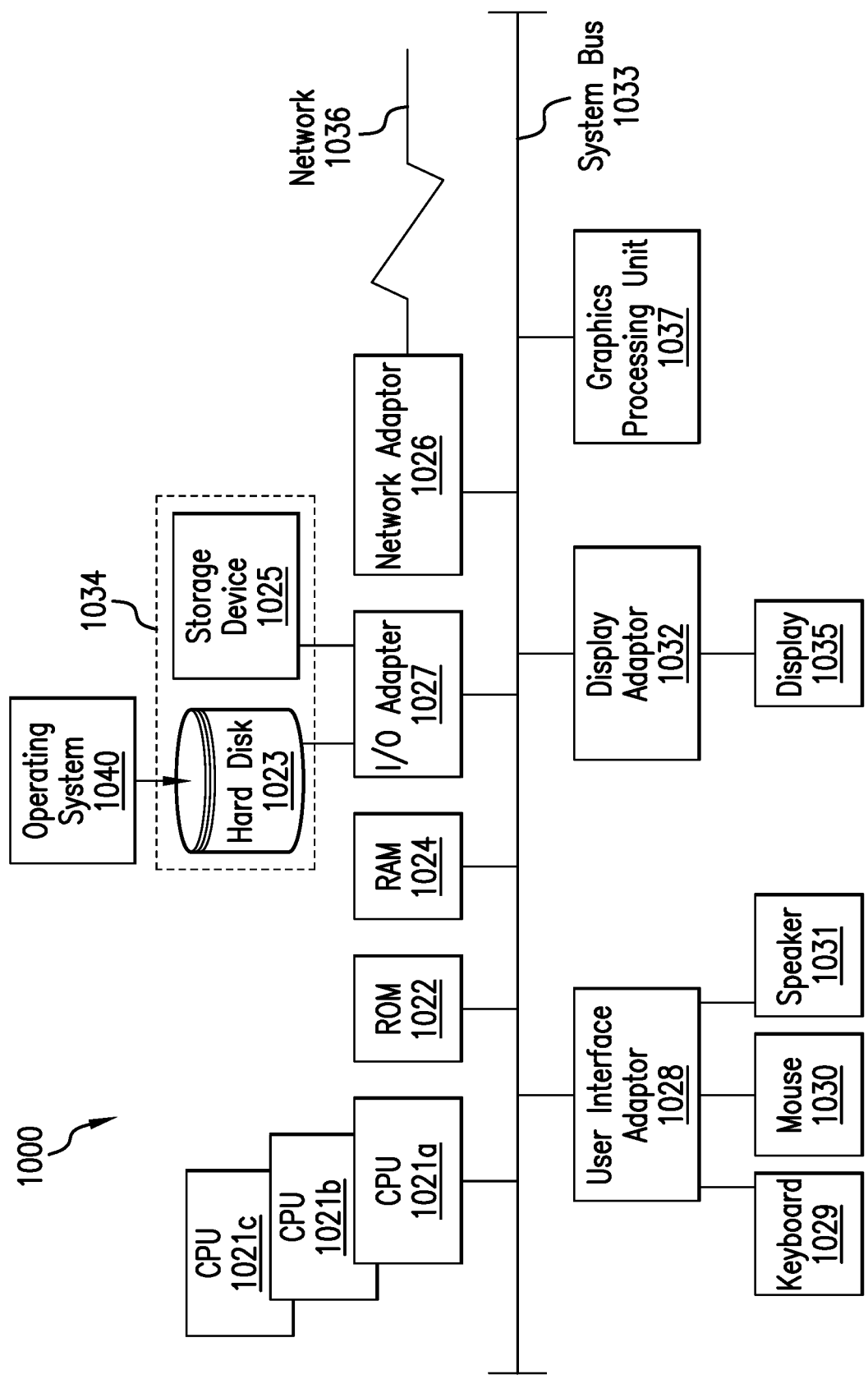
FIG. 10 depicts a block diagram of a processing system for implementing the techniques described herein.

It is understood that one or more embodiments described herein is capable of being implemented in conjunction with any other type of computing environment now known or later developed. For example, FIG. 10 depicts a block diagram of a processing system 1000 for implementing the techniques described herein. In examples, processing system 1000 has one or more central processing units ("processors" or "processing resources") 1021a, 1021b, 1021c, etc. (collectively or generically referred to as processor(s) 1021 and/or as processing device(s)). In aspects of the present disclosure, each processor 1021 can include a reduced instruction set computer (RISC) microprocessor. Processors 1021 are coupled to system memory (e.g., random access memory (RAM) 1024) and various other components via a system bus 1033. Read only memory (ROM) 1022 is coupled to system bus 1033 and may include a basic input/output system (BIOS), which controls certain basic functions of processing system 1000.

Further depicted are an input/output (I/O) adapter 1027 and a network adapter 1026 coupled to system bus 1033. I/O adapter 1027 may be a small computer system interface (SCSI) adapter that communicates with a hard disk 1023 and/or a storage device 1025 or any other similar component. I/O adapter 1027, hard disk 1023, and storage device 1025 are collectively referred to herein as mass storage 1034. Operating system 1040 for execution on processing system 1000 may be stored in mass storage 1034. The network adapter 1026 interconnects system bus 1033 with an outside network 1036 enabling processing system 1000 to communicate with other such systems.

A display (e.g., a display monitor) 1035 is connected to system bus 1033 by display adapter 1032, which may include a graphics adapter to improve the performance of graphics intensive applications and a video controller. In one aspect of the present disclosure, adapters 1026, 1027, and/or 1032 may be connected to one or more I/O busses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 1029, mouse 1030, and speaker 1031 may be interconnected to system bus 1033 via user interface adapter 1028, which may include, for example, a Super I/O chip integrating multiple device adapters into a single integrated circuit.

In some aspects of the present disclosure, processing system 1000 includes a graphics processing unit 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing, and has a highly parallel structure that makes it more effective than general-purpose CPUs for algorithms where processing of large blocks of data is done in parallel.

Thus, as configured herein, processing system 1000 includes processing capability in the form of processors 1021, storage capability including system memory (e.g., RAM 1024), and mass storage 1034, input means such as keyboard 1029 and mouse 1030, and output capability including speaker 1031 and display 1035. In some aspects of the present disclosure, a portion of system memory (e.g., RAM 1024) and mass storage 1034 collectively store the operating system 1040 to coordinate the functions of the various components shown in processing system 1000.

Figure 11A:
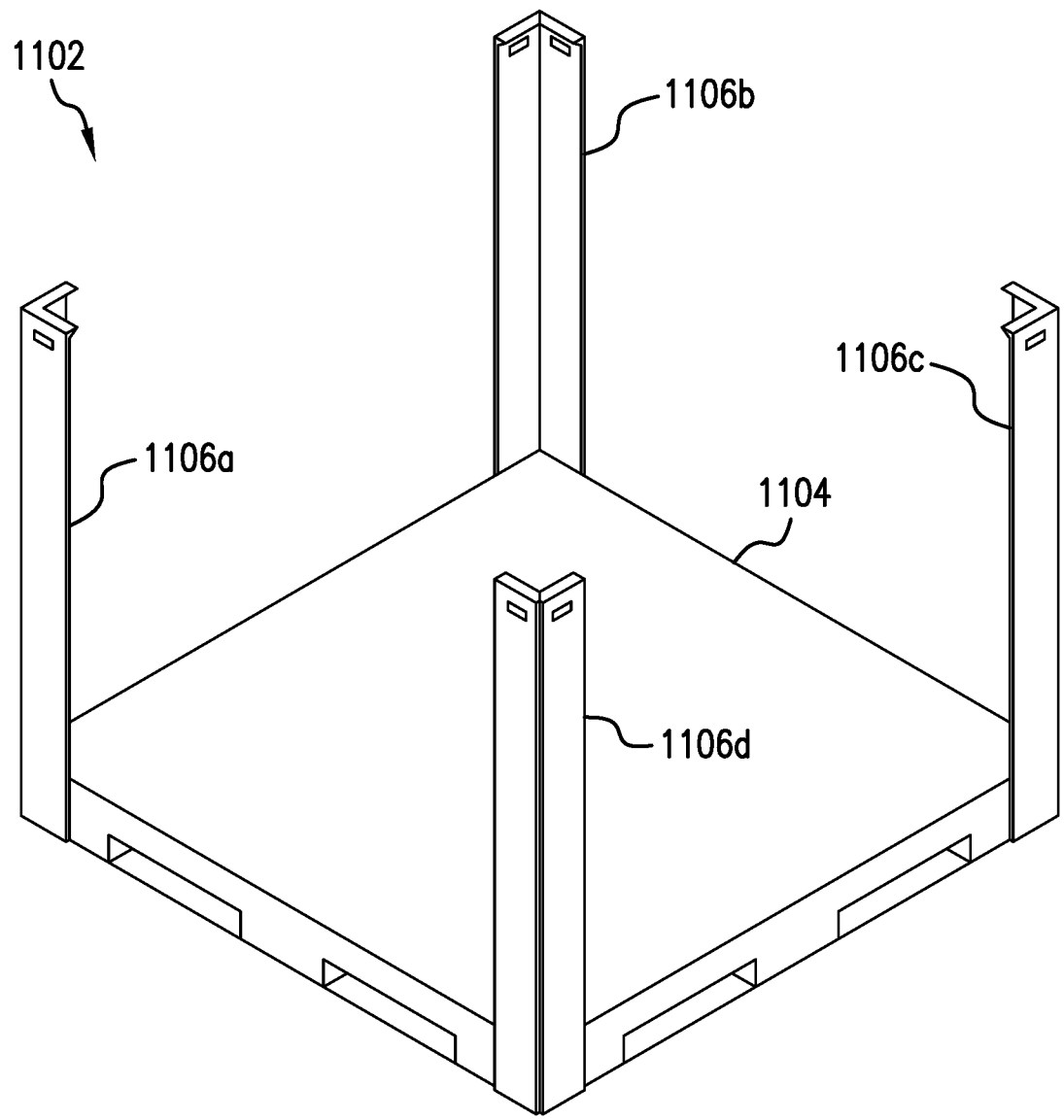
FIG. 11A depicts a perspective view of a pallet according to one or more embodiments described herein.
Figure 11B:
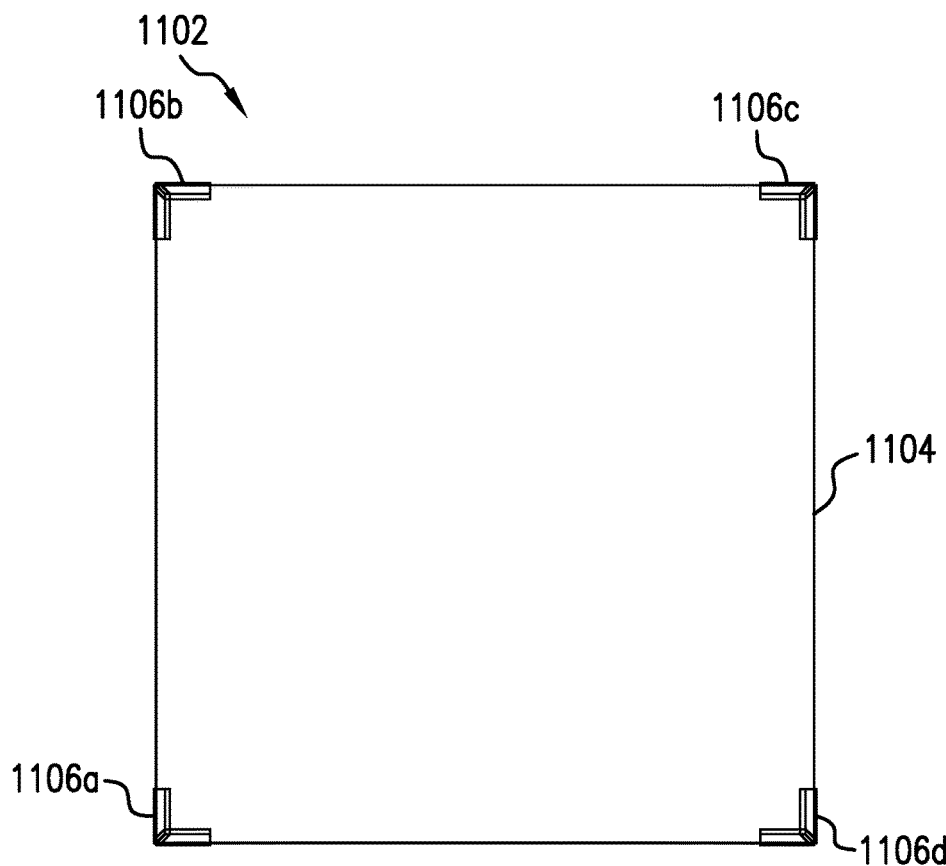
FIG. 11B depicts a top view of the pallet of FIG. 11A according to one or more embodiments described herein.
Figure 11C:
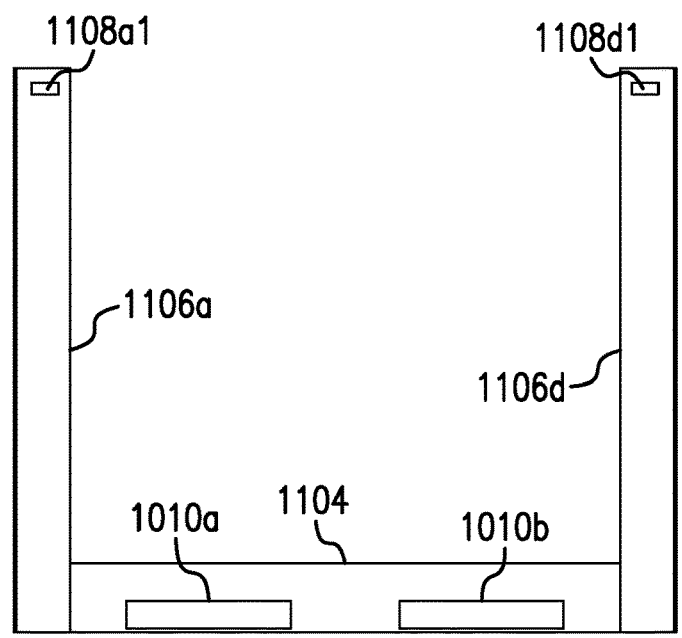
FIG. 11C depicts a side view of the pallet of FIG. 11A according to one or more embodiments described herein.
Figure 11D:
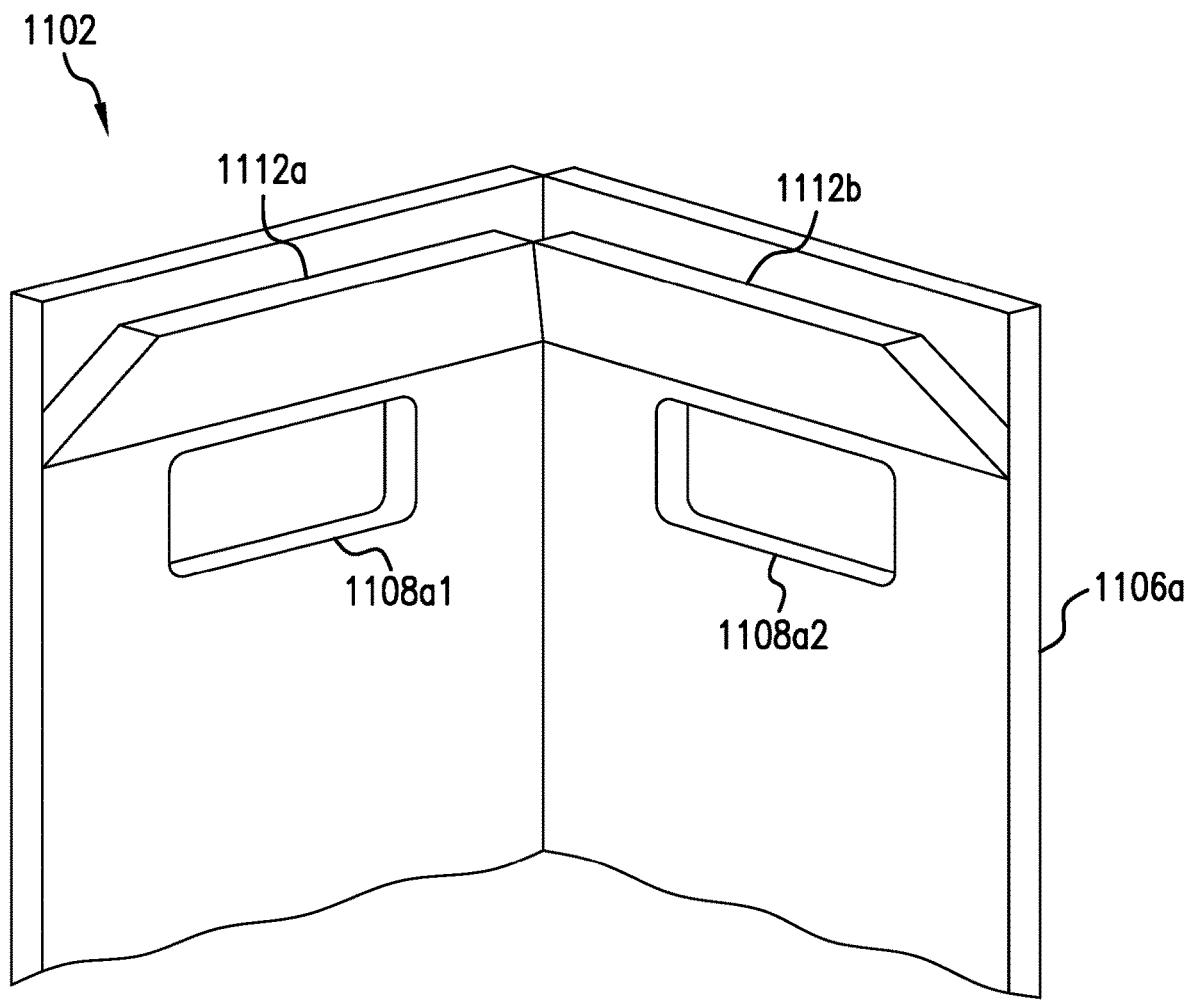
FIG. 11D depicts a perspective view of an end of a support member of the pallet of FIG. 11A according to one or more embodiments described herein.
Figure 11E:
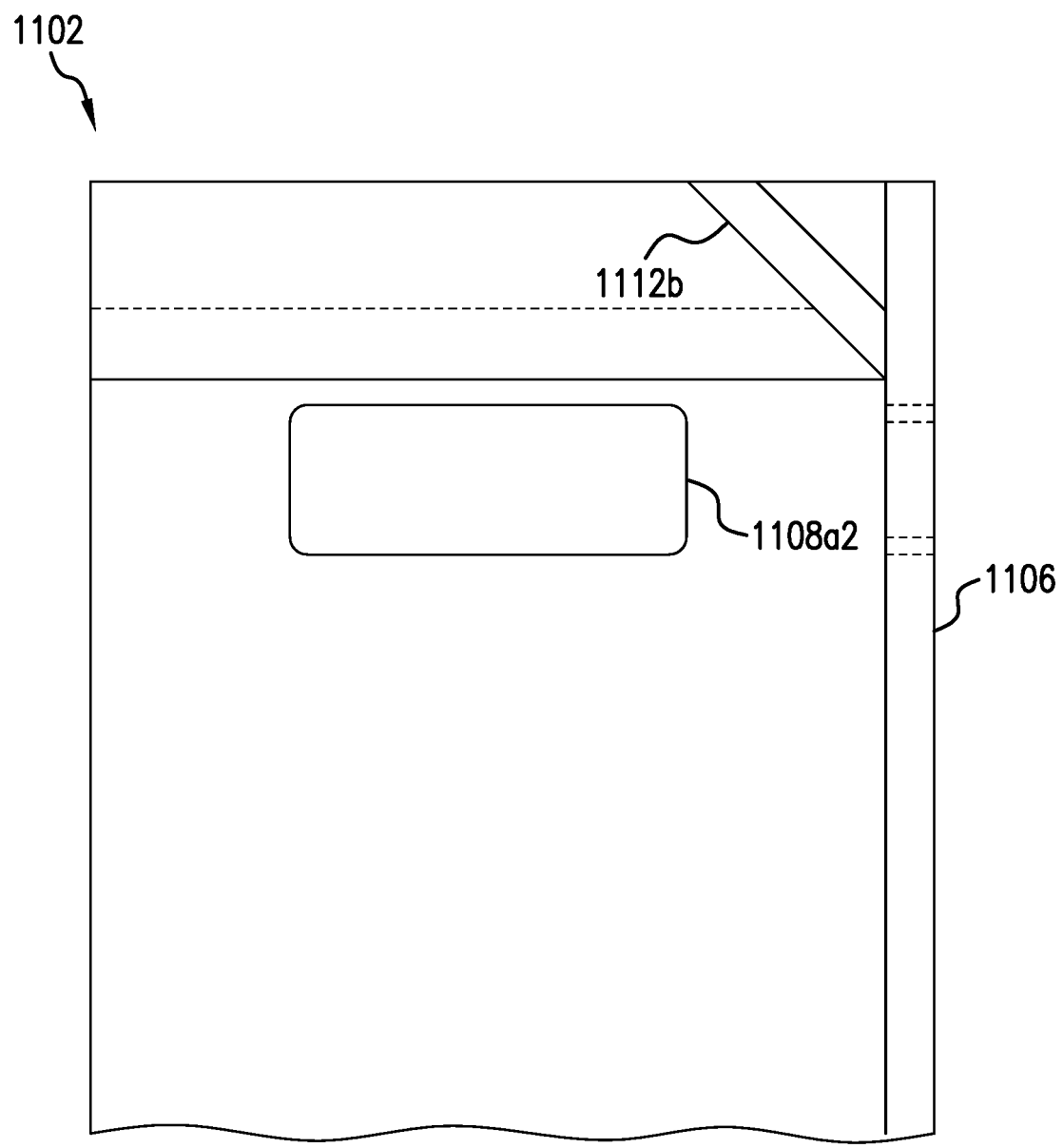
FIG. 11E depicts a side view of the end of the support member of the pallet of FIG. 11A according to one or more embodiments described herein.
Figure 11F:
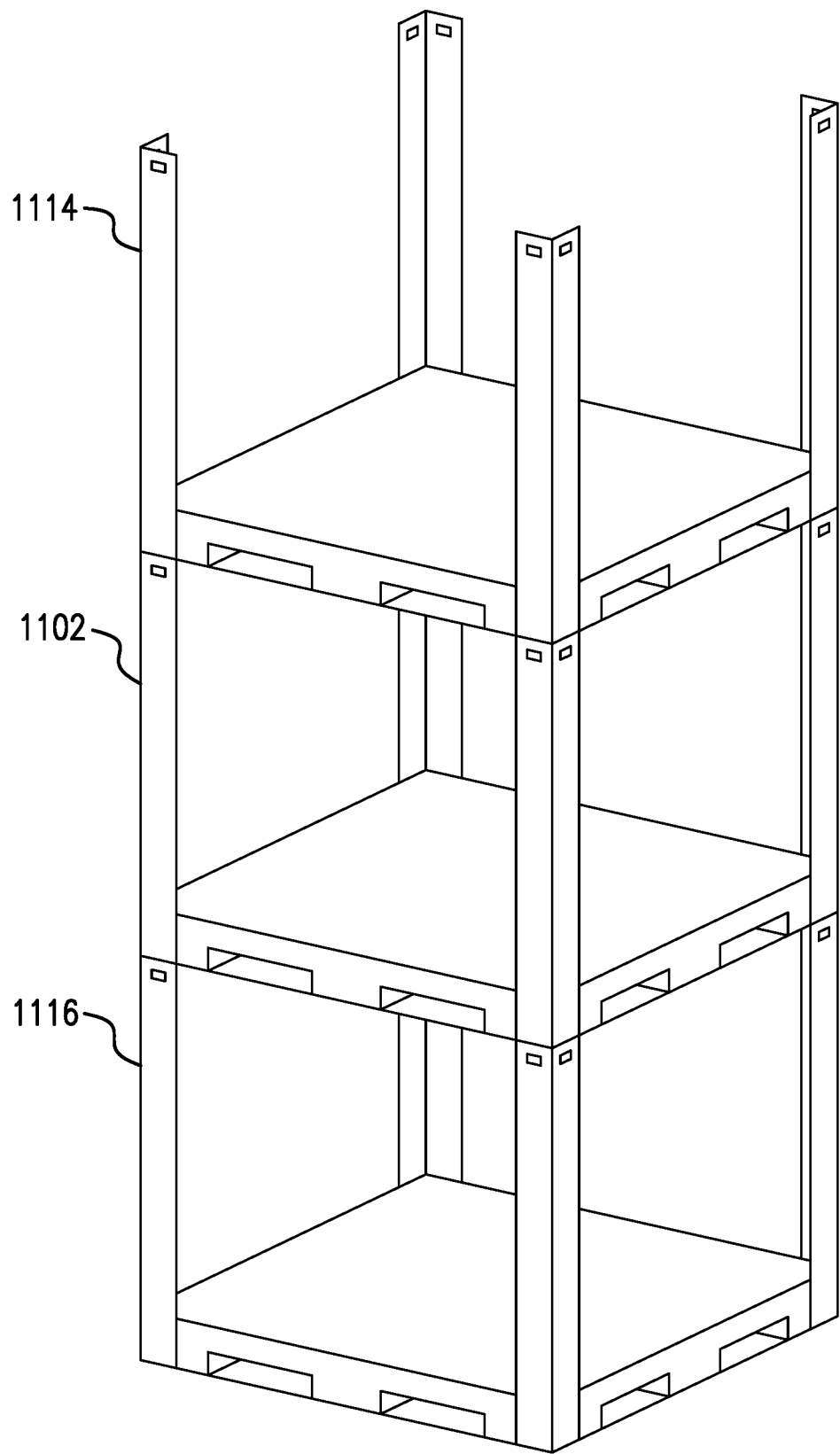
FIG. 11F depicts a plurality of pallets, including the pallet of FIG. 11A, in a stacked arrangement according to one or more embodiments described herein.

Further described herein is a stackable pallet that includes stabilization support for articles to be stacked thereon and to enable pallets to be stacked vertically together. An example of such a pallet is depicted as a pallet 1102 in FIGS. 11A-11F. In particular, FIG. 11A depicts a perspective view of the pallet 1102 according to one or more embodiments described herein. FIG. 11B depicts a top view of the pallet 1102 of FIG. 11A according to one or more embodiments described herein. FIG. 11C depicts a side view of the pallet 1102 of FIG. 11A according to one or more embodiments described herein. FIG. 11D depicts a perspective view of an end of a support member of the pallet 1102 of FIG. 11A according to one or more embodiments described herein. FIG. 11E depicts a side view of the end of the support member of the pallet 1102 of FIG. 11A according to one or more embodiments described herein. FIG. 11F depicts a plurality of pallets, including the pallet 1102 of FIG. 11A and pallets 1114 and 1116, in a stacked arrangement according to one or more embodiments described herein. The pallet 1102 is now described in more detail with reference to FIGS. 11A-11F.

As shown at least in FIG. 11A, the pallet 1102 includes a base 1104 and a plurality of support members 1106a, 1106b, 1106c, 1106d extending from the base 1104. Although four support members 1106a—d are shown, other numbers of support members can be used in other examples. Each of the support members can also include one or more indexing features, such as the indexing features 1108a1, 1108a2, and 1108d1 (see FIGS. 11C and 11D) in corresponding support members 1106a and 1106b. The pallet 1102 can also include forklift slots 1010a, 1010b that can be engaged by forks on a forklift.

As shown in FIGS. 11D and 11E, the each of the support members 1106a-d can also include pallet stacking supports 1112a, 1112b that support another pallet that can be stacked on top of (upwardly adjacent to) the pallet 1102 (see, e.g., FIG. 11F). For example, as shown in FIG. 11F, the pallet 1102 is stackable. For example, a pallet 1114 can be stacked vertically on top of the pallet 1102. Similarly, the pallet 1102 can be stacked on a pallet 1116. In examples, the pallets 1102, 1114, 1116 can utilize the pallet stacking supports (e.g., the pallet stacking supports 1112a, 1112b) as indexing features to maintain position and enable their repositioning and restacking, such as by the gantrybot 220.

Example embodiments of the disclosure include or yield various technical features, technical effects, and/or improvements to technology. Example embodiments of the disclosure provide technical solutions for automated storage optimization and stackable pallets. The techniques described herein enable improved storage and delivery of pallets and/or products stored on the pallets while minimizing time-to-delivery, improving accuracy, and increasing the number of pallets that can be stored in a particular space. These technical solutions provide the ability for hydrocarbon exploration and recovery operations to improve production, for example, by determining when to add certain additives based on data about the hydrocarbon exploration and recovery operation and delivering such additives quickly and efficiently. Accordingly, the present techniques improve hydrocarbon exploration and recovery operations by improving productivity through accuracy, precision, and speed.

Set forth below are some embodiments of the foregoing disclosure:

Embodiment 1

A system comprising: a pallet comprising: a base; and a support member extending from the base, the support member configured to support another pallet upwardly adjacent to and spaced from goods on the pallet, wherein the support member is configured with an indexing feature; a robot comprising a pallet engaging member configured to engage the pallet at the indexing feature on the support member; and a control system to control the robot based on a task

Embodiment 2

A system according to any prior embodiment, wherein the robot further comprises an object engaging member configured to engage one or more of the goods on the pallet.

Embodiment 3

A system according to any prior embodiment, wherein the object engaging member comprises a vacuum gripper.

Embodiment 4

A system according to any prior embodiment, wherein the pallet engaging member comprises an indexing member to align the pallet engaging member and the pallet.

Embodiment 5

A system according to any prior embodiment, wherein the pallet engaging member comprises an indexing member to engage the indexing feature of the support member.

Embodiment 6

A system according to any prior embodiment, further comprising a sackbot comprising an object engaging member configured to engage one or more of the goods on the pallet.

Embodiment 7

A system according to any prior embodiment, wherein the control system controls the sackbot based on the task.

Embodiment 8

A system according to any prior embodiment, further comprising a drumbot comprising a suction hose-end of arm tooling.

Embodiment 9

A system according to any prior embodiment, wherein the control system controls the drumbot based on the task.

Embodiment 10

A system according to any prior embodiment, wherein the task is received from an autonomous fluid management system.

Embodiment 11

A system according to any prior embodiment, wherein the support member is configured with a second indexing feature.

Embodiment 12

A system according to any prior embodiment, wherein the task is based on at least one of: real-time or near-real-time data collected at a hydrocarbon exploration and recovery operation; or a fluid plan associated with a hydrocarbon exploration and recovery operation.

Embodiment 13

A pallet comprising: a base; and a support member extending from the base, the support member configured to support another pallet upwardly adjacent to and spaced from goods on the pallet, wherein the support member is configured with an indexing feature.

Embodiment 14

A pallet according to any prior embodiment, wherein the support member is configured with a second indexing feature.

Embodiment 15

A pallet according to any prior embodiment, wherein the support member is a first support member, and wherein the pallet further comprises: a second support member extending from the base; a third support member extending from the base, and a fourth support member extending from the base.

Embodiment 16

A pallet according to any prior embodiment, wherein the support member is configured with a pallet stacking support to support the other pallet upwardly adjacent to the pallet.

Embodiment 17

A method comprising: receiving a task from an autonomous fluid management system, the task being based on at least one of a fluid plan or real-time data associated with hydrocarbon exploration and recovery operation; distributing the task to at least one of a plurality of robots based at least in part on a type of the task; and causing the at least one of the plurality of robots to execute the task.

Embodiment 18

A method according to any prior embodiment, wherein the robot is a gantrybot, and wherein the task is one of to relocate a pallet or to relocate an item stored on the pallet.

Embodiment 19

A method according to any prior embodiment, wherein the robot is a sackbot, and wherein the task is to relocate an item stored on a pallet.

Embodiment 20

A method according to any prior embodiment, wherein the robot is a drumbot, and wherein the task is to pump a liquid product stored in a drum.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A system comprising:
   a pallet comprising:
   a base; and
   a plurality of support members extending vertically from the base, the support members being configured to support another pallet upwardly adjacent to and spaced from goods on the pallet, wherein each of the support members comprises an indexing feature configured to be engaged by a pallet engaging member;

a robot comprising the pallet engaging member configured to engage the pallet at the indexing feature of each support member; and a control system to control the robot based on a hydrocarbon exploration and recovery task.

2. The system of claim 1, wherein the robot further comprises an object engaging member configured to engage one or more of the goods on the pallet.

3. The system of claim 2, wherein the object engaging member comprises a vacuum gripper.

4. The system of claim 1, wherein the pallet engaging member comprises an indexing member to align the pallet engaging member and the pallet.

5. The system of claim 1, wherein the pallet engaging member comprises an indexing member to engage the indexing feature of the each support member.

6. The system of claim 1, further comprising a sackbot comprising an object engaging member configured to engage one or more of the goods on the pallet.

7. The system of claim 6, wherein the control system controls the sackbot based on the hydrocarbon exploration and recovery task.

8. The system of claim 1, further comprising a drumbot comprising a suction hose-end of arm tooling.

9. The system of claim 8, wherein the control system controls the drumbot based on the hydrocarbon exploration and recovery task.

10. The system of claim 1, wherein the hydrocarbon exploration and recovery task is received from an autonomous fluid management system.

11. The system of claim 1, wherein the support member is configured with a second indexing feature.

12. The system of claim 1, wherein the hydrocarbon exploration and recovery task is based on at least one of:

real-time or near-real-time data collected at a hydrocarbon exploration and recovery operation; or a fluid plan associated with a hydrocarbon exploration and recovery operation.

13. A pallet comprising:

a base; and a plurality of support members extending vertically from the base, the support members being configured to directly support another pallet at an upward end of each support member, the another pallet being upwardly adjacent to and spaced from goods on the pallet, wherein each of the support members comprises an indexing feature configured to be engaged by a pallet engaging member of a robot.

14. The pallet of claim 13, wherein each of the support members is configured with a second indexing feature.

15. The pallet of claim 13, wherein the plurality of support members comprises a first support member extending vertically from the base;

a second support member extending vertically from the base;

a third support member extending vertically from the base, and a fourth support member extending vertically from the base.

16. The pallet of claim 13, wherein each of the support members comprises a pallet stacking support to support the other pallet upwardly adjacent to the pallet.

17. A method comprising:

receiving a hydrocarbon exploration and recovery task from an autonomous fluid management system, the hydrocarbon exploration and recovery task being based on at least one of a fluid plan associated with a hydrocarbon exploration and recovery operation or real-time data associated with a hydrocarbon exploration and recovery operation;

distributing the hydrocarbon exploration and recovery task to at least one robot of a plurality of robots based at least in part on a type of the hydrocarbon exploration and recovery task; and causing the at least one robot of the plurality of robots to execute the hydrocarbon exploration and recovery task.

18. The method of claim 17, wherein the at least one robot of the plurality of robots is a gantrybot, and wherein the hydrocarbon exploration and recovery task is one of to relocate a pallet or to relocate an item stored on the pallet.

19. The method of claim 17, wherein the at least one robot of the plurality is a sackbot, and wherein the hydrocarbon exploration and recovery task is to relocate an item stored on a pallet.

20. The method of claim 17, wherein the at least one robot of the plurality is a drumbot, and wherein the hydrocarbon exploration and recovery task is to pump a liquid product stored in a drum.

* * * * *